3,043,889
PRODUCTION OF FLUOROETHYLENES

Lee B. Smith, Woodbridge, and Cyril Woolf, Morristown, N.J., assignors to Allied Chemical Corporation, New York, N.Y., a corporation of New York
No Drawing. Filed Mar. 22, 1960, Ser. No. 16,634
3 Claims. (Cl. 260—653.5)

This invention relates to manufacture of chlorotrifluoroethylene, $CClF=CF_2$.

Commercial production of chlorotrifluoroethylene is customarily effected by reduction of $CCl_2FCClF_2$ with zinc dust in the presence of alcohol. In view of the obvious cost disadvantages inherent in the metallic zinc procedure, several proposals have been made as to production of chlorotrifluoroethylene by catalytic reaction of $CCl_2FCClF_2$ and hydrogen. In prior catalytic methods, various metals and metal compounds have been suggested as catalysts, and the reactors employed have been made of various metals such as nickel, stainless steel, iron and platinum. In some instances prior art catalysts have effected acceptable conversion and yields. However, catalyst longevity, a highly important factor in any gas-phase catalytic process, has been poor, and further some of the prior art catalysts which effect promising conversion and yields, in addition to being short-lived, are not readily amenable to regeneration. In the case of metal reaction vessels, at the fairly high temperatures needed to bring about good conversion and yields, the metal of metallic reaction vessels promotes fragmentation and carbonization. Moreover formation of halides, both chloride and fluoride, of the metal of the reactor has been pronounced and sufficient, more often than not, to plug up reactor outlet conduits with condensed halides and shorten operational runs some times as little as 4 to 6 hours.

The reaction involved in production of chlorotrifluoroethylene by catalytic reaction of $CCl_2FCClF_2$ and hydrogen is represented by $$CCl_2FCClF_2 + H_2 \rightarrow CClF=CF_2 + 2HCl$$

This reaction inherently tends to form substantial amounts of by-products other than the sought-for $CClF=CF_2$. Such by-products may be classified in two groupings: compounds such as $CHF=F_2$ and $CHClFCClF_2$ which have not been defluorinated and are readily chlorinatable back to the $CCl_2FCClF_2$ starting material for recycling purposes; and compounds represented by $CH_2=CF_2$, $CH_3CF_3$, $CHClF_2$ and $CCl_2=CF_2$ which have been defluorinated or are otherwise not chlorinatable back to the $CCl_2FCClF_2$ starting material. While compounds of the first group may be chlorinated back to $CCl_2FCClF_2$, such rechlorination requires a supplemental process step use of which should be reduced desirably to a minimum. More importantly by-products of the second group represent fluorine irrecoverably lost with respect to production of $CClF=CF_2$, and to the extent of such loss overall process yield is correspondingly reduced.

A major object of this invention is to provide a process for making $CClF=CF_2$ by catalytic reaction of $$CCl_2FCClF_2$$

and hydrogen by procedure which effects high per pass yields, and remarkably high overall yields, i.e. high overall transformation of the $CCl_2FCClF_2$ starting material to the sought-for $CClF=CF_2$. This objective is accomplished by provision of the herein process which not only brings about high yields of $CClF=CF_2$ per pass, but also minimizes to a few percent the per pass formation of by-products of both the foregoing groups, that is those readily chlorinatable to $CCl_2FCClF_2$ and those not chlorinatable to $CCl_2FCClF_2$.

According to the invention, it has been found that the foregoing objectives may be attained by carrying out the reaction in the presence of a certain catalyst and within a reactor having reaction-exposed surfaces made of certain refractory materials, and by careful control of reaction conditions with respect to temperature and mol ratios of $CCl_2FCClF_2$ organic starting material to hydrogen.

The catalyst employed in practice of the invention is chromium oxide, $Cr_2O_3$, which may be made into suitable catalyst form by any one of several known procedures. The chromium oxide may be utilized in supported or unsupported condition, unsupported as chromium oxide pellets, or supported on refractory material e.g. silica, alumina, or Alundum chips, or calcium or magnesium fluoride. If chromium oxide in pelletized form is desired, chromium hydroxide may be precipitated for example from a solution of 530 g. of $Cr(NO_3)_3 9H_2O$ in 2000 ml. of water by adding, with agitation, 500 g. of 28% $NH_4OH$, and heating to about 95° C. The precipitated hydroxide may be separated from the solution by filtration, dried at temperature of about 125° C., and suitably pelletized to form pellets of e.g. ⅛″ dia. x ⅜″ long. Chromium oxide catalyst in supported form may be prepared by soaking Alundum chips, e.g.: 4-8 mesh, in a saturated solution of chromium nitrate, filtering, drying, and heating at temperature of about 200° C. for about 3 hours to convert the nitrate to the oxide. Alternatively, supported chromium oxide catalyst may be made by coprecipitating chromium hydroxide and a refractory material such as calcium or magnesium fluoride, and after filtering and washing, heating the filter cake to convert the hydroxide of chromium to the oxide. Following is a specific example for making a supported chromium oxide catalyst suitable for use in practice of the invention. 173 g. $Mg(NO_3)_2 6H_2O$ and 147 g. $Cr(NO_3)_3 9H_2O$ are dissolved in 1400 ml. of water. To this, while agitating, is added a solution of 79 g. KF and 62 g. KOH in 800 ml. of water. The mixture is boiled, filtered, washed, the cake dried at 120° C., and granulated to e.g. 6–14 mesh size. In the case of unsupported catalysts, the latter consist of $Cr_2O_3$ in granule or pellet form of say ⅛″ dia. x ⅜″ long, and in the case of supported catalysts, such catalysts consist of $Cr_2O_3$ and the refractory inert supporting material, and may contain by weight from one or more percent up to about 60%, preferably 2.5 to 45% of $Cr_2O_3$.

It has been found, as herein demonstrated, that under the described conditions of reaction these catalysts are highly active as to $CClF=CF_2$ formation minimize fragmentation and carbonization and formation of all types of byproducts, and are notably long-lived. Regeneration is simple when needed, and may be effected by discontinuing the feed of organic and hydrogen, purging with nitrogen, and then feeding air or oxygen for about 2 hours without changing the reactor temperature.

A second important factor in practice of the invention lies in the materials which comprise the reactor surfaces exposed to reaction conditions. In accordance with the invention, these surfaces are made of non-metallic refractory oxide material of the group consisting of Alundum, porcelain, fused silica and zirconia. These materials minimize carbonization and fouling of catalyst, and substantially eliminate in the reaction zone the presence of metal halides which are characteristic of the prior art catalytic methods of the type under discussion. Metal halides adversely affect catalyst longevity, enhance deterioration of metallic reactors themselves, and most disadvantageously result in plugging up of the gas conduit between the outlet of the reactor and the recovery system with condensed metal halides.

Temperatures employed in practice of the invention fall within a relatively narrow range. Some reaction takes hold at temperatures of about 475° C. However, worthwhile minimum reaction zone temperature of about 485° C. is preferred. As to maximum temperature, in order to obtain the high per pass and high overall yields hereinafter demonstrated, temperatures should not exceed about 550° C., preferred temperature being substantially in the range of 500–550° C. Practice in this temperature range avoids fragmentation, carbonization, minimizes formation of by-products of both types, and particularly by-products not chlorinatable to $CCl_2FCClF_2$.

A process control factor of major importance is the mol ratios of the $CCl_2FCClF_2$ organic starting material to hydrogen in the vapor phase mixture of incoming reactants charged into the reaction zone. Herein the term "conversion" denotes mol percent of organic starting material consumed. Investigations show that, in order to effect attainment of the demonstrated yields, the reaction should be carried out in such a way, with regard to temperature, mol ratios of incoming reactants and contact time, as to effect relatively low conversions per pass. In practice, it is desirable to adjust proportions of the incoming $CCl_2FCClF_2$ and hydrogen reactants so as to bring about conversion per pass in the range of about 15–30%, preferably 20–30%. This objective is accomplished by supplying to the reaction zone a vapor-phase mixture of $CCl_2FCClF_2$ and hydrogen in mol ratio of not less than 1.25 mol of $CCl_2FCClF_2$ per mol of hydrogen. In the interest of consistently good results, it is preferred to employ reactant feed in amounts not substantially less than 2 mol proportions of $CCl_2FCClF_2$ per mol of hydrogen. It has been found that a greater proportion of hydrogen sharply decreases per pass yield of $CClF=CF_2$ and notably increases formation of by-products not chlorinatable to $CCl_2FCClF_2$. Maximum proportion of $CCl_2FCClF_2$ in the reactor feed is not particularly critical although no advantages are obtained by use of more than about 4 mols of $CCl_2FCClF_2$ per mol of hydrogen. In best operation, the vapor-phase mixture fed to the reactor contains $CCl_2FCClF_2$ and hydrogen in mol proportions of substantially 2 to 3 mols of $CCl_2FCClF_2$ per mol of hydrogen. Contact time may vary in the range of about 2–25 seconds, preferably 2–15 seconds, and may be chosen and co-ordinated with temperature and mol ratios by a test run or two.

Handling and recovery of materials exiting the reaction zone may be substantially as conventional in this art. For example, the reactor zone exit may be water-scrubbed to remove HCl and any HF and possibly condense and collect some of the relatively high boiling $CCl_2FCClF_2$. The vaporous exit of the scrubber may be dried as by a calcium chloride tower, the exit of which may be totally condensed in Dry Ice and liquid nitrogen cold traps connected in series. The condensates from the cold traps may be combined with any high boiling organic condensate collected in the water scrubber, and may then be distilled in the usual way. By-products chlorinatable to $CCl_2FCClF_2$ may be so chlorinated as known in the art and recycled along with unreacted $CCl_2FCClF_2$.

As will be seen from the following examples, in the better embodiments of the invention, yields of $CClF=CF_2$ per pass are high, i.e. in the general range of 70–80%. Starting material losses to by-products not chlorinatable to $CCl_2FCClF_2$ are around 2%, and such losses combined with mechanical losses are less than 5%. Further, transformation per pass of starting material to by-products chlorinatable to $CCl_2FCClF_2$ is of the order of 3% and less, thus reducing to a minimum the amount of material to be rechlorinated to $CCl_2FCClF_2$. By recycling unreacted $CCl_2FCClF_2$ and by-products chlorinatable to $CCl_2FCClF_2$, overall yields of starting material to $CClF=CF_2$ are well upwards of 90% and usually better than 95%. Further, catalyst longevity is notable as is shown by the examples. In runs similar to those given in the examples, and using $Cr_2O_3$ supported on Alundum chips, the catalyst was used for about 53 hours before regeneration, and thereafter for about 155 hours with no significant activity decline.

In the following examples "conversion" indicates mol percent of organic starting materials consumed, and "yield" indicates mol percent of starting material consumed which was transformed to sought-for product, i.e. $CClF=CF_2$. Percentages noted are mol percent unless otherwise indicated.

*Example 1.*—The reactor employed was an Alundum tube of 1″ I.D. and 36″ long mounted in an electrically heated furnace which enveloped approximately the central 30″ length of the tube. The central 13″ length of the reactor contained about 168 ml. of catalyst which consisted of chromium oxide on Alundum chips prepared, as previously described, by soaking Alundum chips, 4 x 8 mesh, in a saturated solution of chromium nitrate, drying, and heating to convert the nitrate to the oxide. The catalyst contained about 3% by weight of chromium oxide, $Cr_2O_3$. Over a period of about 5 hrs., there were passed into the reactor about 3.12 mols of vaporized $CCl_2FCClF_2$ and about 1.5 mols of hydrogen. Mol ratio of organic starting material to hydrogen was about 2:1. Temperature in the heated section of the reactor was maintained at about 525° C. throughout the run. Rate of feed of reactants was such that retention time of reactants in the reactor was about 10 seconds. Reactor exit material handling and recovery was as previously described, i.e. substantially as conventional in this art. On final distillation of the combined condensates from the Dry-Ice and liquid nitrogen cold traps combined with the high boiling organic condensate collected in the water scrubber there were obtained 0.0106 mol $CHF=CF_2$, B.P. minus 62° C.; 0.0254 mol of material collectively including $CH_2=CF_2$, $CH_3CF_3$ and $CHClF_2$ having respective boiling points of minus 83° C., minus 47.3° C., and minus 40.8° C.; 0.56 mol $CClF=CF_2$, B.P. minus 26.8° C.; 0.03 mol $CCl_2=CF_2$, B.P. 18.9° C.; 0.091 mol $CHClFCClF_2$, B.P. 28° C.; and 2.35 mols $CCl_2FCClF_2$, B.P. 47.7° C. Organic material recovery amounted to about 97.5% of the $CCl_2FCClF_2$ fed. Conversion per pass was about 24.5%, and yield of $CClF=CF_2$ per pass was about 73%. Loss of starting material to by-products not chlorinatable to $CCl_2FCClF_2$, and represented by $CH_2=CF_2$, $CH_3CF_3$, $CHClF_2$ and $CCl_2=CF_2$, was only about 1.8%. Further, transformation of organic starting material to $CHF=CF_2$ and $CHClFCClF_2$ which are byproducts readily chlorinatable to $CCl_2FCClF_2$, was only about 2.3%. As to organic starting material, mechanical loss plus loss to by-products not chlorinatable to the $CCl_2FCClF_2$ amounted to only about 4.3% per pass. Thus, by recycling unreacted $CCl_2FCClF_2$ and by-products chlorinatable to $CCl_2FCClF_2$, overall transformation of organic starting material to $CClF=CF_2$ is better than 95%. Up to the end of this run the catalyst had been in use in similar runs for about 52.5 hours without regeneration.

*Example 2.*—Apparatus and catalyst employed were as in Example 1. Over a period of about 5 hrs., there were passed into the reactor about 2.78 mols of vaporized $CCl_2FCClF_2$ and about 1.5 mols of hydrogen. Mol ratio of organic starting material to hydrogen was about 2:1. Temperature in the heated section of the reactor was maintained at about 525° C. throughout the run. Rate of feed of reactants was such that retention time of reactants in the reactor was about 10 seconds. Reactor exit material handling and recovery was as in Example 1. On final distillation of the combined condensates from the Dry-Ice and liquid nitrogen cold traps combined with the high boiling organic condensate collected in the water scrubber there were obtained 0.02 mol of material collectively including $CH_2=CF_2$, $CH_3CF_3$ and $CHClF_2$; 0.009 mol $CHF=CF_2$; 0.51 mol $CClF=CF_2$; 0.03 mol $CCl_2=CF_2$; 0.06 mol $CHClFCClF_2$; and 2.14 mols $CCl_2FCClF_2$. Organic material recovery amounted to about 99.5% of the $FCl_2FCClF_2$ fed. Conversion per pass was about 23%, and yield of $CClF=CF_2$ per pass was about 80%. Loss of starting material to by-products not chlorinatable to $CCl_2FCClF_2$, and represented by $CH_2=CF_2$, $CH_3CF_3$, $CHClF_2$ and $CCl_2=CF_2$, was only about 1.8%. Further, transformation of organic starting material to $CHF=CF_2$ and $CHClFCClF_2$, which are by-products readily chlorinatable to $CCl_2FCClF_2$, was only about 2.5%. As to organic starting material, mechanical loss plus loss to by-products not chlorinatable to the $CCl_2FCClF_2$ amounted to only about 2.2% per pass. Thus, by recycling unreacted $CCl_2FCClF_2$ and by-products chlorinatable to $CCl_2FCClF_2$, over-all transformation of organic starting material to $CClF=CF_2$ is better than 97%.

*Example 3.*—The reactor employed was an Alundum tube of ⅝" I.D. and 36" long mounted in an electrically heated furnace which enveloped approximately the central 30" length of the tube. The central 14" length of the reactor contained about 70 ml. of catalyst which consisted of chromium oxide prepared, as previously described, by coprecipitating chromium hydroxide and magnesium fluoride, filtering, washing, drying, granulating to 6 x 14 mesh, and heating to convert the hydroxide of chromium to the oxide. The catalyst contained 40% by weight of chromium oxide $Cr_2O_3$, balance, magnesium fluoride acting as a support. Over a period of about 5 hrs., there were passed into the reactor about 2.16 mols of vaporized $CCl_2FCClF_2$ and about 2.25 mols of hydrogen. Mol ratio of organic starting material to hydrogen was about 1:1. Temperature in the heated section of the reactor was maintained at about 525° C. throughout the run. Rate of feed of reactants was such that retention time of reactants in the reactor was about 4 seconds. Reactor exit material handling and recovery was as previously described, i.e. substantially as conventional in this art. On final distillation of the combined condensates from the Dry-Ice and liquid nitrogen cold traps combined with the high boiling organic condensate collected in the water scrubber there were obtained 0.179 mol of material collectively including $CH_2=CF_2$, $CH_3CF_3$ and $CHClF_2$; 0.071 mol $CHF=CF_2$; 0.466 mol $CClF=CF_2$; 0.008 mol $CCl_2=CF_2$; 0.022 mol $CHClFCClF_2$; and 1.353 mols $CCl_2FCClF_2$. Organic material recovery amounted to about 97.3% of the $CCl_2FCClF_2$ fed. Conversion per pass was about 37%, and yield of $CClF=CF_2$ was about 51%. Loss of starting material to by-products not chlorinatable to $CCl_2FCClF_2$, and represented by $CH_2=CF_2$, $CH_3CF_3$, $CHClF_2$ and $CCl_2=CF_2$, was about 8.6%. Further, transformation of organic starting material to $CHF=CF_2$ and $CHClFCClF_2$, which are by-products readily chlorinatable to $CCl_2FCClF_2$, was only about 4.3%. As to organic starting material, mechanical loss plus loss to by-products not chlorinatable to the $CCl_2FCClF_2$ amounted to about 11.3% per pass. By recycling unreacted $CCl_2FCClF_2$ and by-products chlorinatable to $CCl_2FCClF_2$, overall transformation of organic starting material to $CClF=CF_2$ is better than 88%. Up to the end of this run the catalyst had been in use in similar runs for about 30 hrs. without regeneration and without indication of activity decline. This run demonstrates criticality of mol ratio of organic starting material to hydrogen in the reactor feed. With low ratio, while conversion is higher, yield per pass of $CClF=CF_2$ is notably lower, and loss to by-products not chlorinatable to $CCl_2FCClF_2$ is substantially increased.

We claim:

1. The process for making $CClF=CF_2$ which comprises charging into a reaction zone a vapor-phase mixture of $CCl_2FCClF_2$ and hydrogen in mol proportions of not less than 1.25 mols of $CCl_2FCClF_2$ per mol of hydrogen, subjecting said mixture to heating in said zone to temperatures substantially in the range of 475–550° C. while in the presence of a catalyst consisting of chromium oxide and for contact time substantially in the range of 2–15 seconds to effect per pass conversion of $CCl_2FCClF_2$ substantially in the range 15–30%, said reaction zone being defined by solid surfaces of non-metallic refractory oxide material of the group consisting of Alundum, porcelain, fused silica and zirconia, and recovering $CClF=CF_2$ from the materials exiting the reaction zone.

2. The process of claim 1 in which the said vapor-phase mixture contains $CCl_2FCClF_2$ and hydrogen in mol proportions of not substantially less than 2 mols of $CCl_2FCClF_2$ per mol of hydrogen.

3. The process for making $CClF=CF_2$ which comprises charging into a reaction zone a vapor-phase mixture of $CCl_2FCClF_2$ and hydrogen in mol proportions of substantially 2–3 mols of $CCl_2FCClF_2$ per mol of hydrogen, subjecting said mixture to heating in said zone to temperatures substantially in the range of 500–550° C. while in the presence of a catalyst consisting of chromium oxide and for contact time substantially in the range of 2–15 seconds to effect per pass conversion of $CCl_2FCClF_2$ substantially in the range 15–30%, said reaction zone being defined by solid Alundum surfaces, and recovering $CClF=CF_2$ from the materials exiting the reaction zone.

References Cited in the file of this patent
UNITED STATES PATENTS

| | | |
|---|---|---|
| 2,697,124 | Mantell | Dec. 14, 1954 |
| 2,864,873 | Miller et al. | Dec. 16, 1958 |